April 29, 1924.

R. E. TALLEY

COMPOSITE GEAR WHEEL

Filed Dec. 29, 1922  2 Sheets-Sheet 1

1,492,145

WITNESSES:
H. O. Funk.
R. J. Fitzgerald.

INVENTOR
Randal E. Talley.
BY
W. B. Jaspert.
ATTORNEY

April 29, 1924.

R. E. TALLEY 1,492,145

COMPOSITE GEAR WHEEL

Filed Dec. 29, 1922      2 Sheets-Sheet 2

WITNESSES:
H. O. Funk
R. J. Fitzgerald

INVENTOR
Randal E. Talley.
BY
M. B. Jaspert
ATTORNEY

Patented Apr. 29, 1924.

1,492,145

UNITED STATES PATENT OFFICE.

RANDAL E. TALLEY, OF NORTH IRWIN, PENNSYLVANIA.

COMPOSITE GEAR WHEEL.

REISSUED

Application filed December 29, 1922. Serial No. 609,832.

*To all whom it may concern:*

Be it known that I, RANDAL E. TALLEY, a citizen of the United States, and a resident of North Irwin, in the county of Westmoreland and State of Pennsylvania, have invented a new and useful Improvement in Composite Gear Wheels, of which the following is a specification.

My invention relates to composite articles, such as the articles of manufacture embodying the well-known phenolic condensation products, more especially to composite gear wheels having a central metallic support or hub portion and a non-metallic working rim portion mounted thereon.

It is among the objects of my invention to provide a composite gear-wheel structure which shall be relatively noiseless in operation, which shall be of durable and strong mechanical qualities, and which shall operate smoothly and efficiently for the transmission of high-speed rotatory movement and relatively large loads when associated with various machine elements.

It is a further object of this invention to provide a gear-wheel of the above-designated character which shall be of simple and relatively inexpensive construction and which shall be adapted to manufacture in production quantities.

There have been in use various types of non-metallic gears which are constructed of composite material, such as glued layers of raw hide, vulcanized fiber, compressed oil impregnated fibers, or fibrous material compounded with a consolidating agent or binder. These composite materials have been utilized in various types of composite gear-wheel structures inasmuch as they require reinforcing or supporting elements to adapt them to the severe operating conditions to which gear wheels are subjected. All of these gear wheels serve their purpose within the limits of their physical and mechanical characteristics and they rank in their order of importance respectively as listed.

The fiber gear is characterized by its dense, hard structure which lends to it a brittleness that is detrimental to the function of a gear wheel as it commonly results in failure of the teeth when subjected to shock and impact. Fiber deteriorates rapidly if subjected to moisture or oil. The raw-hide gear is yielding and spongy, which limits its usefulness to the compressive strength of the material, and, further, raw hide is pervious to moisture and atmospheric changes which distorts the gear teeth due to warping, swelling and shrinking.

The compressed cotton or fabric gear comprises a spun, or spinnable textile fabric or loose fibers which are assembled between a pair of steel plates by which the material is compressed to provide a working body portion and the plates are secured as by rivets or screws to sustain the load on the gear teeth. The compressed gear is of necessity shrouded to the outer extremity of the gear teeth as the plates are the sustaining body portion which resists the loads applied to the teeth and prevents their disintegration.

The consolidated compressed fabric gear wheel is not supported by plates and constitutes a self-sustaining body portion which is formed by consolidating the fabric under heat and pressure with a hardened binder such as the well-known phenolic condensation products. The consolidated body portion has excellent wearing qualities and the teeth formed therein are mechanically strong and durable and resist the erosion of the tooth surface effected by rolling contact with the metallic tooth surface of the mating gear. However, such a gear wheel, because of its density, produces sound which, although of a relatively low pitch, is nevertheless irritable, especially when employed in the timing gear train of automobile engines for which they are commonly used. Another disadvantage of the consolidated gear is its relatively high density throughout, which sometimes causes splitting due to the difference in the thermal expansion of the composite rim and its metallic supporting hub upon which it is molded.

My present invention is directed to a gear-wheel structure which embodies the desirable characteristics of the compressed fabric and the consolidated fabric gear wheels without possessing any of the detrimental qualities of either.

I propose to form the working body portion in which the gear teeth are formed into a consolidated and relatively hard mass while leaving its contiguous body portion a relatively soft mass of lower density. I further propose to mount such a composite rim upon a metallic center or hub which may comprise various forms and which may employ various mechanical means for securing the rim thereon. A gear wheel so constructed provides a durable wearing surface and a resilient tooth portion. The toothed rim functions as an isolated unit and is free to move axially on the hub limited by the untreated support. The yielding support serves as a connection between the toothed body portion and the metallic center or hub.

In the accompanying drawings, constituting a part hereof, and in which like reference characters designate like parts,—

Figure 1:
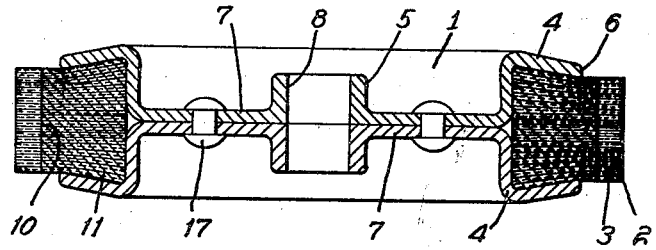
Figure 1 is a cross-sectional view of a composite gear wheel embodying the principles of my invention.

Referring to Fig. 1, the gear wheel therein illustrated comprises a hub portion 1 and a non-metallic rim portion 2, provided with a toothed periphery 3. The hub member 1 consists of a pair of flanged discs 4, which are formed in a suitable manner to provide the seating hub portions 5, flanges 6 and a web 7. The hub 5 is provided with an opening 8, by which it is adapted to be mounted on a shaft or other rotatable element.

Figure 9:
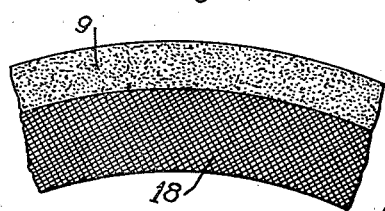
Fig. 9 is a plan view of a segment cut from fibrous sheet material which may be utilized in my gear-wheel structure.

The non-metallic rim 2 may be formed in various ways, as by punching suitable segments (Fig. 9) or rings from fibrous sheet material, such as paper, fabric and the like, and the outer body portion 9 (Fig. 9) of such segments or discs are treated with a binding agent, such as the well-known phenolic condensation products. The treated segments or rings are assembled in superposed layers and consolidated under heat and pressure to form a unitary ring having a dense, consolidated outer body portion 10 and an untreated contiguous dove-tailed portion 11, formed integrally therewith.

Figure 2:
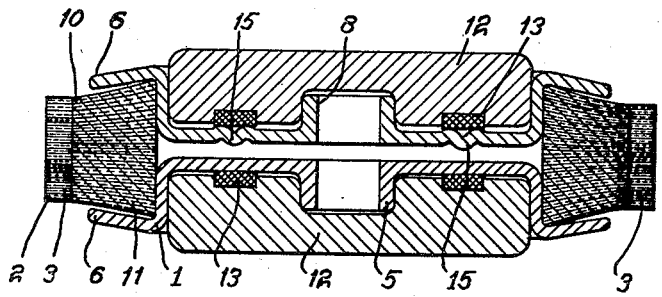
Fig. 2 is an exploded view, partially in cross-section, of a compressed rim showing an intermediate step of the manufacturing process in which the rim is assembled to the hub by means of a pair of pressure dies provided with suitable welding electrodes.
Figure 3:
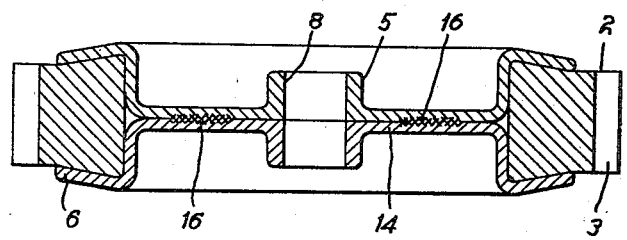
Fig. 3 is a cross-sectional view of an assembled gear wheel having hub members secured to the rim by welding.

The dove-tailed portion 11 consists of laminations which are clamped between the flanges 6 of the hub portion 1 (Fig. 2). The discs 4, constituting the hub portion 1, are assembled between a pair of pressure dies 12, provided with ring-shaped electrodes 13, and pressure is applied thereto to compress the fibrous sheets or laminations 11 until the web portions 7 of the discs 4 make contact. The ring electrodes 13 are energized with a suitable welding current to weld the contacting web portions into an integral structure.

Figure 4:
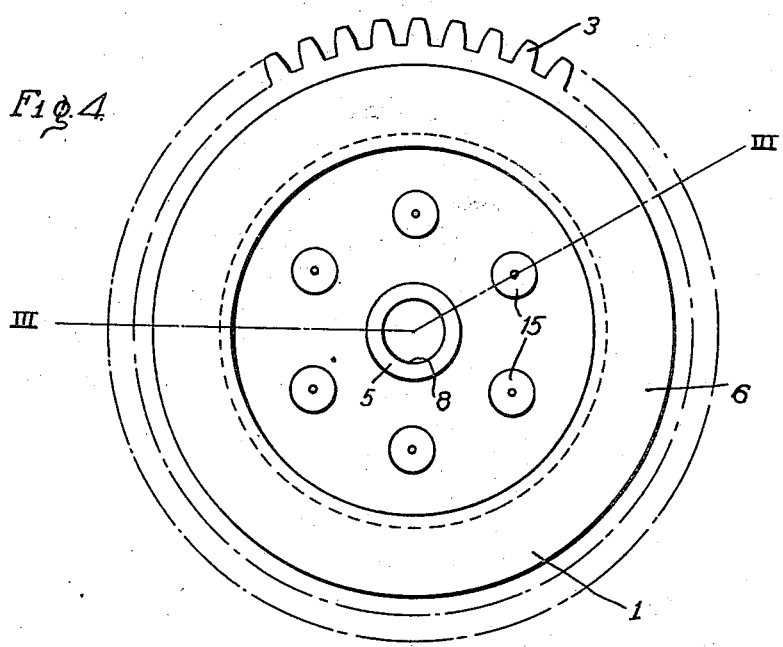
Fig. 4 is an elevational view of an assembled gear wheel made in accordance with my invention.

The web portion 7 may be provided with protuberances 15, which may be in the form of an annular projection or spot projections, as illustrated in Figs. 2 and 4. The projections provide heat and pressure-localizing contact portions, which become fused with the adjacent surface by welding. Instead of welding the hub members, they may be united by rivets 17, Figs. 1 and 7, or in any other suitable manner.

Figure 8:
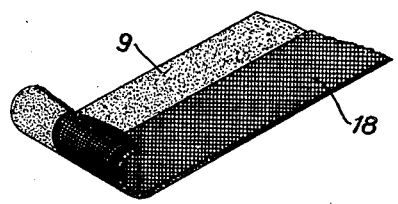
Fig. 8 is a perspective view of a fragmentary portion of a strip of fibrous sheet material employed in forming the rims of the gear wheels.

The non-metallic rim 2 may be formed from a continuous strip 18, (Fig. 8), of fibrous material, such as fabric, which is partially treated by a binding agent, as indicated by the shaded portion 9 and wound into a continuous helix of superposed layers to form a ring which is subsequently compressed and heated to consolidate the treated portion, as above. In winding the strip 18 into a helix, it may be necessary to crimp or otherwise distort the material to compensate for the difference of the outer and inner circumferences of the ring so formed. However, the surplus material of the untreated portion will be assembled between the flanges 6 of the hub member, as described above, to form a gear wheel.

Figure 5:
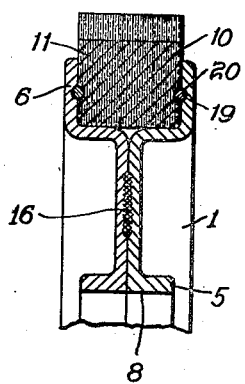
Figs. 5, 6 and 7 are respectively cross-sectional views of fragmentary portions of composite gear wheels illustrating modified forms of mountings of the rim portion to the hub, and various ways of securing the hub body portions.
Figure 6:
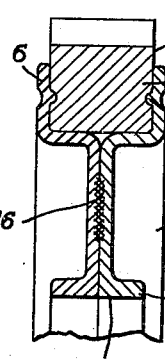
Figure 7:
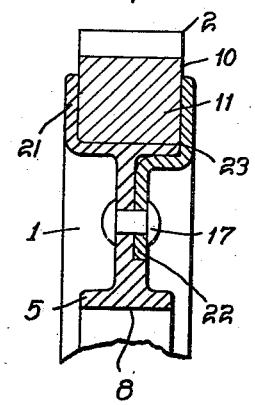

Referring to Figs. 5, 6 and 7, the rim 2 may be united with the hubs 1 in various ways. For instance, in Fig. 5, the flanges 6 are provided with annular grooves 19, which are adapted to receive metal rings such as wires 20, which are forced into the fibrous material 11 by pressure, to prevent any movement between the rim and the hub member. In Fig. 6, the projections 20′, provided by the wires 20, (Fig. 5) may be an integral part of the flange 6. In Fig. 7, the hub may comprise a solid web and rim portion having a single flange 21 and an offset portion 22, which is adapted to receive the flanged ring 23. The ring 23 may be secured to the hub by a plurality of rivets 17 or by welding.

Referring to Fig. 4, the complete gear wheel is provided with a plurality of teeth 3, which are formed in the usual ways, as by cutting or generating. The teeth are formed in the consolidated body portion extending beyond the flanges of the hub. The depth of the consolidated portion may vary from the top to the bottom of the gear teeth or to the top of the flanges or even below the flanges themselves.

Gear wheels formed in accordance with the above description of my invention are provided with a solid metal hub support and a consolidated non-metallic working body portion having gear teeth, and having a relatively yielding intermediate portion therebetween. The advantages of this construction are as follows: The hub portion may be formed of sheet metal punchings, (castings), or forgings which are readily united by riveting or welding. The non-metallic rim is simple to form inasmuch as the excess material at the inner portion of the rim is compressed between the flanges of the hub and the outer portion is a self-sustaining working body which requires no shrouding, thereby eliminating the possibility of metallic contact with the tooth of the mating gear with which it is engaged. The non-treated fibrous portion between the working body portion and the supporting hub provides a yielding cushioning medium through which the torque of the gear wheel is transmitted and further prevents splitting of the toothed portion.

It will be readily understood from the above description of my invention that gear wheels formed in accordance therewith are silent in operation because of a nontreated intermediate portion which eliminates resonance and that the working body portion is resilient and yielding to sudden shock and impact and further possesses a wear resisting tooth portion which compares favorably with the wearing qualities of soft steel and cast iron.

Although I have described a specific embodiment of my invention, it will be obvious to those skilled in the art that various modifications may be made in the details and the method of construction without departing from the principles herein set forth. For instance, the hub portion may assume any shape or form, and the method of fastening the hub members may be varied, inasmuch as any suitable mechanical interlocking means may be substituted for the rivets or the welded joints. The rim construction may be varied in design to obtain any degree of resiliency in the tooth portion as by inserting untreated fibrous portions radially or axially in the consolidated body portion. Any suitable fibrous material, such as wood, wood veneer, fabric, paper, asbestos, rawhide, or vulcanized fiber, may be employed for the rim member, and any suitable binding agent, such as casein, blood glue, and the like may be substituted for the phenolic condensation product. The successive steps of the process of molding the rim and assembling it between the hub flanges may be reversed as the built-up ring may be compressed between the hub flanges prior to molding the outer body portion or the joining of the hub portions and the molding of the rim may be contemporaneous operations. The fibrous material may be treated by dipping after it is assembled to the hub or it may be treated by impregnating it throughout but molding it only to the flange portion.

I claim as my invention:—

1. A composite article comprising a hub portion and a non-metallic rim portion, said rim portion being partially consolidated with a hardened binder.

2. A composite article comprising a hub portion and a partially consolidated non-metallic rim portion of varying density mounted thereon and secured thereto.

3. A composite article comprising a metallic hub, and a non-metallic rim mounted thereon and secured thereto by parallel flanges of said hub, extending radially on the respective side faces of said rim and engaging a portion thereof, said rim consisting of a non-metallic material having its outer body portion extending beyond said hub flanges of greater density than the remaining body portion.

4. A composite article comprising a metallic hub, and a non-metallic rim mounted thereon and secured thereto by parallel flanges of said hub, extending radially on the respective side faces of said rim and engaging a portion thereof, said rim consisting of a non-metallic material having its outer body portion extending beyond said hub flanges of greater density than that portion between the said flanges.

5. A composite article comprising a metallic hub, and a non-metallic rim mounted thereon and secured thereto by parallel flanges of said hub, extending radially on the respective side faces of said rim and engaging a portion thereof, said rim consisting of a non-metallic material having its outer body portion extending beyond said hub flanges consolidated with a hardened binder, and having its remaining body portion untreated.

6. A composite article comprising a hub, and a non-metallic rim mounted thereon and secured thereto, said rim being consolidated with a hardened binder from its outer periphery to a predetermined depth extending radially inward and having its loose body portion compressed between a pair of flanges of said hub.

7. A composite article comprising a hub, and a non-metallic rim mounted thereon and secured thereto, said rim being consolidated with a hardened binder from its outer periphery to a predetermined depth extending radially inward and having its loose body portion secured between a pair of flanges on said hub.

8. A composite article comprising a hub, and a rim of fibrous material mounted thereon and secured thereto, said rim being consolidated with a phenolic condensation product from its outer periphery to a predetermined depth extending radially inward and having its loose body portion secured between a pair of flanges of said hub.

9. A composite article comprising a hub, and a non-metallic rim mounted thereon and secured thereto, said rim comprising a flat strip of fibrous material helically wound into a plurality of superposed convolutions edgewise on the periphery of said hub and secured thereon by a pair of flanges which are adapted to engage a portion of said rim, the body portion extending radially outward from said flanges being consolidated with a hardened binder, and the remaining body portion of said fibrous material being free from a binding agent.

10. A composite article comprising a hub portion consisting of a pair of metal discs secured to form a unitary member, and a non-metallic rim mounted on said hub member, said rim being partially consolidated with a hardened binder.

11. A composite article comprising a hub portion consisting of a pair of metal discs secured to form a unitary member, a non-metallic rim secured between offset flanges of said hub member having part of its body portion clamped therebetween and having the portion extending beyond said flanges of greater density than said clamped portion.

12. A composite article comprising a hub portion consisting of a pair of metal discs secured to form a unitary member, a non-metallic rim secured between offset flanges of said hub member having part of its body portion compressed therebetween and having the portion extending beyond said flanges of greater density than said clamped portion.

13. A composite article comprising a hub, a non-metallic fluted rim mounted thereon, the fluted portion of said rim being of greater density than its remaining body portion.

14. A composite article comprising a hub, a non-metallic rim having a consolidated fluted portion mounted on said hub and yielding means between the fluted portion of said rim and the said hub, said means consisting of a fibrous body portion comprising an integral part of said consolidated portion.

15. A composite article comprising a hub, a non-metallic rim having a fluted portion consolidated with a hardened binder mounted on said hub and yielding means between the fluted portion of said rim and the said hub, said means consisting of a fibrous body portion comprising an integral part of said consolidated portion.

16. The method of making a composite article which comprises, forming a ring of fibrous material having only a portion of its body treated with a binder and consolidating said treated portion to form an integral mass.

17. The method of making a composite article which comprises forming a ring of fibrous material having only a part of its body portion treated with a binder and consolidating said treated portion to form an integral mass.

18. The method of making a composite article which comprises forming a ring of fibrous material having only a part of its body portion treated with a binder and consolidating said treated portion under the influence of heat and pressure to form an integral mass.

19. The method of making a composite article which comprises forming a ring of superposed layers of fibrous material being partially treated with a binder, and consolidating said treated portion under the influence of heat and pressure to form an integral mass.

20. The method of making a composite article which comprises forming a ring of superposed segments of fibrous material being partially treated with a binder, and consolidating said treated portion under the influence of heat and pressure to form an integral mass.

21. The method of making a composite article which comprises forming a ring of superposed layers of fibrous material having the laminations radially disposed with the center thereof partially treating said layers with a binding agent and consolidating said treated portion.

22. The method of making a composite article which comprises forming a ring of fibrous material by superposing a plurality of laminations having a partial treatment of a binding agent in alinement, subjecting the built-up laminations to heat and pressure to consolidate the treated portions, assembling the ring so formed between the flanges of a hub member and compressing the material therebetween, and simultaneously securing the hub members to form an integral structure.

23. The method of making a composite article which comprises forming a ring of superposed layers of fibrous sheet material having its outer body portion treated with a binder, consolidating the treated portion by the application of heat and pressure and clamping the untreated portion under pressure between the flanges of a hub.

24. The method of making a composite article which comprises forming a ring of superposed layers of fibrous sheet material having its outer body portion impregnated with a binder, consolidating the impregnated portion by the application of heat and pressure and clamping the untreated portion under pressure between the flanges of a hub.

25. The method of making a composite article which comprises forming a ring of superposed layers of fibrous sheet material having its outer body portion treated with a phenolic condensation product, consolidating the treated portion by the application of heat and pressure and clamping the untreated portion under pressure between the flanges of a hub.

26. The method of making a composite article which comprises forming a ring of superposed layers of fabric having its outer body portion treated with a phenolic condensation product, consolidating the treated portion by the application of heat and pressure and clamping the untreated portion under pressure between the flanges of a hub.

27. The method of making a composite article which comprises forming a ring of an endless strip of fibrous material having its outer body portion treated with the binder, consolidating the treated portion by the application of heat and pressure and clamping the untreated portion under pressure between the flanges of a hub.

28. The method of making a composite article which comprises forming a ring of superposed layers of fibrous sheet material having its outer body portion treated with a binder, consolidating the treated portion by the application of heat and pressure, and securing the flanges to maintain the clamped ring portion under compression.

29. The method of making a composite article which comprises forming a ring of superposed layers of fibrous sheet material having its outer body portion treated with a binder, consolidating the treated portion by the application of heat and pressure, clamping the untreated portion under pressure between the offset flanges of a pair of metal discs and securing said discs to form an integral structure.

30. The method of making a composite article which comprises forming a ring of superposed layers of fibrous sheet material having its outer body portion treated with a binder, consolidating the treated portion by the application of heat and pressure, clamping the untreated portion under pressure between the offset flanges of a pair of metal discs and securing said discs by welding to form an integral structure.

31. The method of making a composite article which comprises forming a ring of superposed layers of fibrous sheet material having its outer body portion treated with a binder, consolidating the treated portion by the application of heat and pressure, clamping the untreated portion under pressure between the offset flanges of a pair of metal discs and securing said discs by riveting to form an integral structure.

32. The method of forming composite articles which comprises forming a ring of superposed layers of fibrous sheet material having its outer body portion treated with a binder, compressing and securing the untreated portion between the flanges of a metal hub and subsequently consolidating the treated portion by the application of heat and pressure.

In testimony whereof, I have hereunto subscribed my name this 27 day of December, 1922.

RANDAL E. TALLEY.